Sept. 10, 1968  F. A. ZIHERL  3,400,827
LIQUID AND CHIP SEPARATOR

Filed Feb. 7, 1966  3 Sheets-Sheet 1

INVENTOR.
FRANK A. ZIHERL
BY
Meyer, Tilberry & Body
ATTORNEYS

INVENTOR.
FRANK A. ZIHERL
BY
Meyer, Tilberry & Body
ATTORNEYS

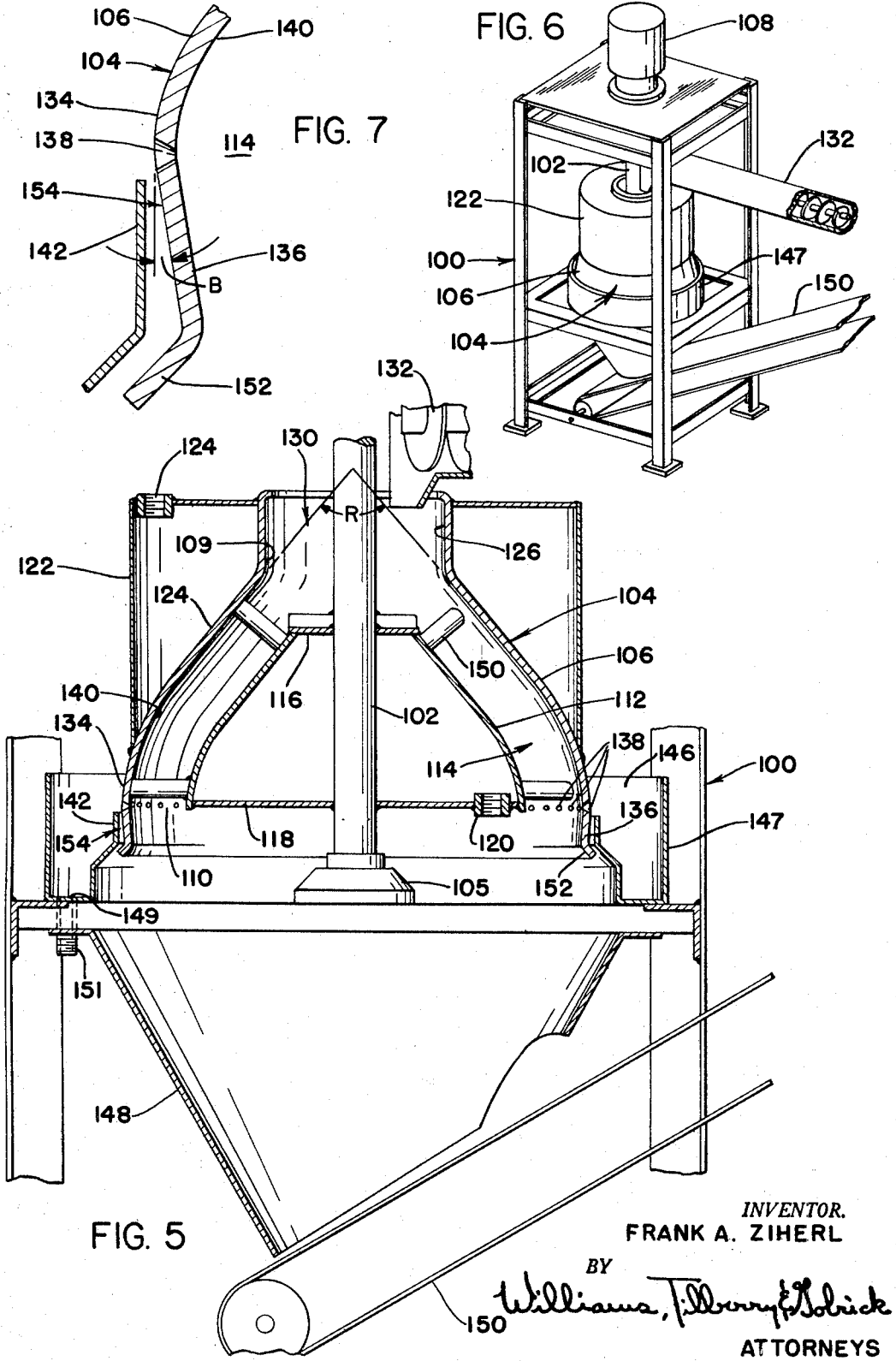

United States Patent Office 3,400,827
Patented Sept. 10, 1968

3,400,827
LIQUID AND CHIP SEPARATOR
Frank A. Ziherl, Richmond Heights, Ohio, assignor to Parker-Hannifin Corporation, Cleveland, Ohio, a corporation of Ohio
Continuation-in-part of application Ser. No. 444,906, Mar. 16, 1965. This application Feb. 7, 1966, Ser. No. 530,743
7 Claims. (Cl. 210—377)

This application is a continuation-in-part application of my copending application Ser. No. 444,906, filed Mar. 16, 1965, now abandoned, which was in turn a continuation of my copending application Ser. No. 41,351, filed July 7, 1960, now abandoned. Application Ser. No. 41,351 was in turn a continuation-in-part application of my prior application Ser. No. 790,596, filed Feb. 2, 1959, now abandoned.

This invention relates to an improvement in a device for the separation of liquids from metal scrap and particularly to an improvement in an automatic and continuously operating device for the separation of cutting liquids lubricants, oils, and the like from metal scrap. More specifically, my invention relates to an improvement in an automatic and continuously operating device for the separation of liquids from metal scrap which will indiscriminately accept scrap, steel, iron, brass, and aluminum, as well as most other ferrous and nonferrous scrap materials, without experiencing work stoppage due to clogging action of the scrap with respect to the various mechanisms of the apparatus.

By definition, the term "scrap," as used in this application, will be understood to include all normal by-products of metal-working operations such as turnings in general of all kinds, chips, shavings, broken or pulverized chips, generally referred to as fines, butt-ends, and the like. Also by definition, "liquid" is defined to include all liquids whether or water, oil or other bases used in conjunction with metalworking operations, and which adhere to the surface of scrap thereby rendering it "liquid-laden" or "soaked."

Other than my United States Letters Patents Nos. 2,878,943 and 2,907,517, there is no known prior art method or apparatus, of which I am aware, for continuously separating liquids from metal scrap, and particularly I am aware of no known prior art apparatus for continuously recovering liquids from scrap wherein both the liquid and the scrap are reclaimed. As stated in the above identified patents, the generally employed prior art method of separating liquid from scrap involves the use of a large basket of about four to five feet in diameter and approximately three feet deep. This basket is placed in a drum designated for this purpose and the basket and drum are rotated together to produce a centrifugal action on the liquid and the scrap whereby the liquid is separated by centrifugal force from the metal scrap. The liquid is drained from the drum, and the basket is then removed from the drum and the scrap is dumped into a receptacle of some means for subsequent disposal. In view of the bulk and weight of metal scrap, the size of the basket is such that it normally requires an overhead crane to lower the basket into the drum and to remove it thereafter upon completion of the oil recovery process.

This prior art method is unsatisfactory in several respects. In the first place, an inordinate amount of time is necessarily consumed in loading and unloading the basket, and otherwise handling and re-handling the scrap. Scrap in the center of the drum does not turn as fast as scrap near the outer wall, and the scrap is therefore not rendered consistently dry throughout. Furthermore, this system is not adaptable to continuous operation inasmuch as the machine can only operate on one batch of scrap at a time. A still further limitation of the apparatus resides in the fact that it requires the attention of at least one man on a continuous basis. Finally, it has been a matter of experience that the saving in reclaimed oil and scrap barely justifies the cost of operating the separator.

These and other disadvantages of the prior devices for removing liquid from metal or other scrap are overcome by the present invention which is directed toward an improved device for continuously removing liquid from a moving mass of scrap.

In accordance with the present invention, there is provided an improvement in a centrifugal separator including a receptacle rotatable about a vertical axis. This improvement includes forming the receptacle with a smooth inner surface extending from an upper charging opening to a lower discharge opening, and the surface has an imperforate upper and lower portion. The upper portion tapers outwardly and downwardly, the lower portion tapers only slightly inwardly and downwardly to form a taper reverse to the taper of the upper portion, and small outlets are provided in the receptacle at the junction between the upper and lower portions.

By providing a smooth inner surface, the scrap may move through the receptacle without contacting any irregularities which could cause a damming of the compact mass of scrap moving through the receptacle. By providing only a slight taper at the lower portion of the receptacle, liquid may flow upwardly toward the outlets while the compacted mass of scrap is forced by gravity and centrifugal force downwardly from the receptacle. Without such a smooth uninterrupted surface and a slight taper on the lower portion, the compacted scrap mass, which is like a putty, will dam in the receptacle and stop flow.

It is a primary object of the present invention to provide an improved liquid and scrap separator which may be operated continuously and efficiently with a minimum of supervision and manual attention.

Other objects of the invention include the provision of an inexpensive novel liquid and scrap separator which can be continuously conveyor loaded and unloaded; a novel liquid and scrap separator which is a fraction of the size of present devices and which is at least of equal capacity when compared on a tonnage per hour basis; the provision of a novel liquid and scrap separator which will indiscriminately accept steel, iron, brass, aluminum, and most other ferrous and nonferrous scrap such as chips, turnings, shavings, fines, and the like without experiencing work stoppage due to clogging or jamming of the scrap with respect to the various mechanisms of the apparatus; and the provision of a liquid from scrap separator having but one principal moving part thereby rendering the apparatus substantially maintenance free and inexpensive to manufacture and operate.

To the accomplishment of the foregoing and related objects, the invention consists of means hereinafter fully described and particularly pointed out in the claims, the drawings, and the following description setting forth in detail certain structure embodying the invention, such disclosed means constituting, however, but one of the various forms in which the principle of the invention may be used. Reference is now made to the figures in which like parts are designated by like numerals.

FIGURE 5 is an elevational view in section of the preferred embodiment of the invention;

FIGURE 6 is a perspective view of the preferred embodiment of the invention; and FIGURE 7 is an enlarged fragmentary sectional view of the liquid separating zone of the preferred embodiment of the invention, shown with exaggerated inclination for illustrative purposes.

Briefly stated, the general organization of my invention comprises a continuous-operation liquid and scrap separator into which liquid laden metal scrap is continuously charged by conveyor means and the like through the upper end of a spinning hollow frusto-conical receptacle or member. Scrap intercepting and deflecting means are positioned within the frusto-conical member to direct the scrap radially outwardly against the interior wall surface of the receptacle. The resolution of centrifugal forces acting upon the scrap is in a downward and outward direction whereby the scrap is urged from the top to the bottom of the member. The centrifugal force is sufficiently high to compact the mass into a high consistency material which hinders flow, but increases the separating action and maintains the mass against the inner separating surface.

In one embodiment the circular peripheral edge of the lower or bell end of the frusto-conical member or receptacle is overlapped by the bell or wide end of an inverted frusto-conical member, and the two members are coupled to spin together about a common axis of rotation. The narrow end of the lower member is provided to be sufficiently wide so as to permit scrap to drop freely therethrough. Liquids originally adhering to the scrap are also centrifuged into contact with the interior wall of the upper member, and forced downwardly toward its lower peripheral edge. However, once the liquid reaches this edge portion, it passes over to the upwardly and outwardly inclined interior wall surface of the lower member. The liquid on the lower member moves upwardly while the mass continues its uninterrupted flow through the device. The interior wall surfaces of the two members are radially spaced apart to permit the liquid to continue upwardly to the upper peripheral edge of the lower member where it is then collected and further processed. This mechanism does not hinder the smooth movement of the compacted mass of material.

In a second and preferred embodiment of the invention, the circular peripheral edge of the bell end of the frusto-conical upper member is integrally joined with an inverted frusto-conical skirt, and interstices are provided at the junction between these two members. In other words the device includes an inner uninterrupted, smooth surface that allows continued flow of the mass. The resolution of forces on the liquid is defined by the locus of interstices, so that all liquid must pass through the interstices and into a collecting pan or tank. The liquid moves both upwardly and downwardly toward the junction, while the mass moves downwardly.

Figure 1:
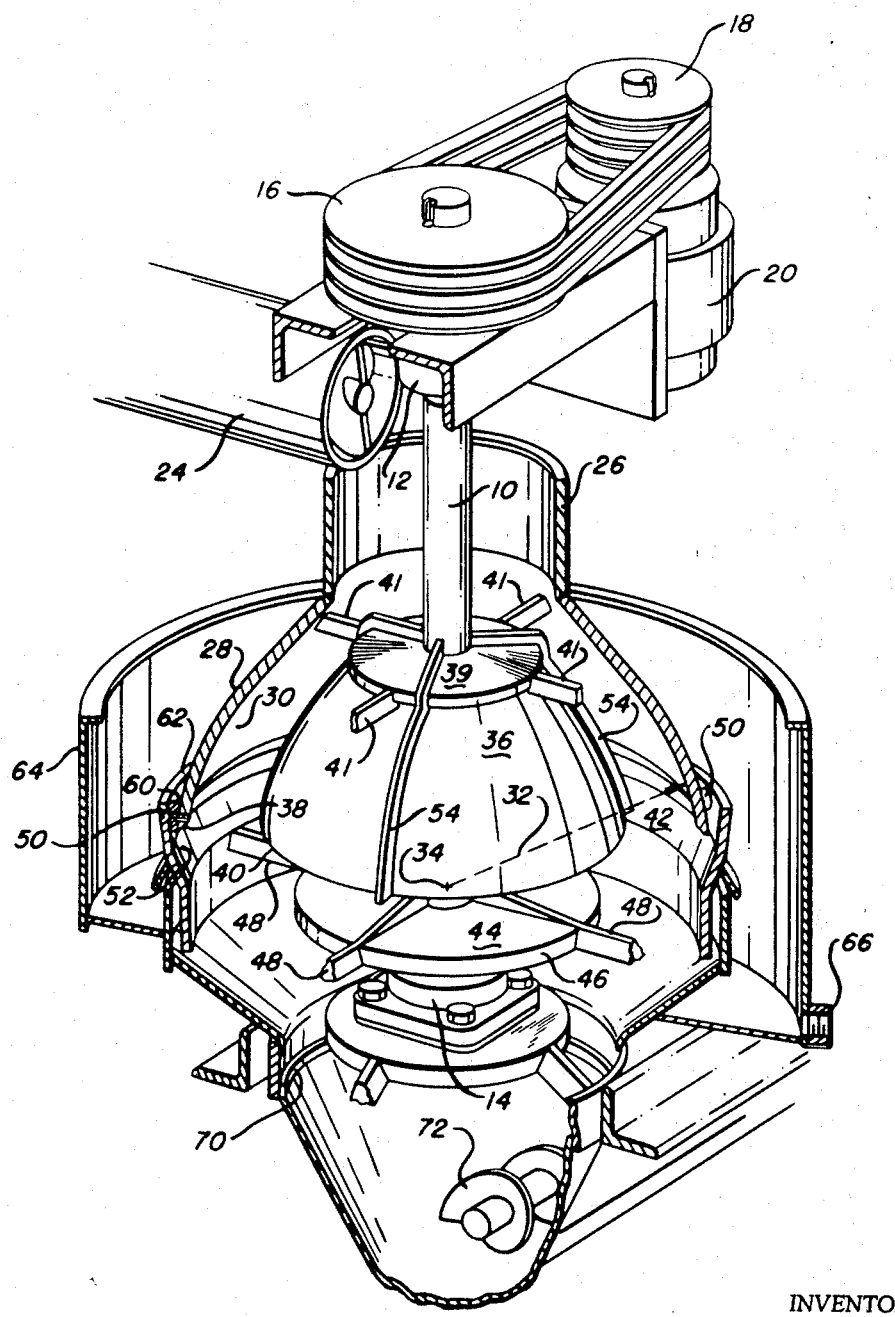
FIGURE 1 is a partially sectioned perspective view of an embodiment of the invention showing the structural relationship between all moving and stationary parts.

Referring now more particularly to FIGURE 1, a first embodiment of my invention comprises a vertically aligned drive shaft 10 journaled at opposite ends 12 and 14 for rotation, and being provided with pulley sheaves 16 at its extreme upper end. The sheaves 16 are belt connected to sheaves 18 of drive motor 20. A screw conveyor 24 discharges liquid laden scrap into a cylindrical hopper portion 26 adjacent the opening into a bell shaped housing member 28 concentrically secured to the shaft 10 for rotation therewith. The bell housing 28 flares outwardly and downwardly so as to provide an inclined inner wall surface 30 having a slight radius of curvature 32 as measured from point 34 on the drive shaft 10. A scrap interceptor and deflector member 36 is concentric with housing 28 and of the same general configuration, but spaced radially inwardly away from the inner wall surface 30 to define a passageway from hopper portion 26 to the extreme lower peripheral edges 38 and 40 of members 28 and 36, respectively. The upper portion of member 36 comprises a substantially flat horizontally disposed scrap interceptor plate 39 rigidly secured to drive shaft 10. Connecting arms 41 support and secure housing 28 to drive shaft 10.

An inverted frusto-conical collar member 42 is positioned beneath member 28, and extends outwardly and upwardly above the peripheral edge 38 of member 28. The frusto-conical collar 42 is secured to the drive shaft 10 for rotation therewith by a spider member 44 comprising a circular center portion 46 secured to the drive shaft 10 and a plurality of connecting arms 48 fastened to the collar 42, and collar member 42 is spaced radially a slight amount from peripheral edge 38 of member 28. To provide rigidity to the overall structure, the collar member 42 is secured at spaced intervals to the lower portion of member 28 by fastening means 50.

It is to be expressly noted that collar member 42 is flared upwardly and outwardly so as to provide an inner wall surface 52 which is inclined vertically and outwardly from the axis of the drive shaft 10. Thus, I have provided substantially a three element integral unit rotating in unison about a common axis; one element 28 being inclined downwardly and outwardly from the axis of rotation in overlapping relationship with a second element 42 which is inclined upwardly and outwardly, and spaced a slight increment radially away from the first element. The third element 36 is secured within the first element 28 and is provided with scrap deflector blades 54, to be described more fully hereinbelow. By providing a slight radius of curvature 32 to the inner wall surface 30, a general transition in downward direction is provided to prevent congestion of scrap at the intersection between members 28 and 42. The curvature of member 28, allows the scrap to flow downwardly without abruptly changing directions. This smooth flow is continued at the lower member or collar 42 which forms a gradual transition for the mass into a downward and inward direction.

In operation, liquid laden scrap is fed automatically by conveyor means 24 into the opening provided by hopper portion 26, and then drops by gravity onto the scrap interceptor plate 39. While scrap is being fed into hopper portion 26, the entire separator including upper and lower members 28 and 42, respectively, and inner member 36, are all spinning as a single unit at a high rate of speed. The scrap making contact with interceptor plate 39 is accelerated thereby, and thereafter contrifugally deflected to the inner surface 30 of upper member 28 with the assistance of deflector blades 54.

The outward and downward inclination of inner wall surface 30 is such that the scrap is compacted and then atuomatically forced downwardly, assisted by the pressure or weight of the scrap being continuously fed into the hopper 26. At the same time, liquids, previously adhering to the scrap, are centrifuged to the inner wall surface 30 and in like manner are forced downwardly until periphery 38 is reached, at which time the liquids are spun across the radial air gap between members 28 and 42 onto inner wall surface 60 of collar 42. However, because of the reversal of inclination of surface 60 from that of surface 30, the resultant force upon the liquids and scrap is reversed to produce an upwardly directed force component. The liquid thereafter follows the surface 60 upwardly to the top edge of edge 62 of collar 42 from where it is collected in a stationary liquid reservoir 64. At the same time the weight and centrifugal force on the scrap forces it to continue downwardly. The liquid is removed from the reservoir 64 through the outlet port 66 for subsequent disposal, and the scrap is discharged from the bottom of member 42.

The speed at which scrap passes through the apparatus will be dependent on the angle of inclination of the inner wall surface 30 of upper member 28 as well as the inclination of inner wall surface 60 of lower member 42. In accordance with the invention, as will be discussed later with respect to another embodiment, the surface 30 forms an included angle of 15°–85°. The angle which surface 52 forms with a vertical line may be varied between 0°–15°; in practice, this angle is 3°–10°. However, it is essential to the proper functioning of the embodiment of the apparatus shown in FIGURE 1, that the inclined angular relationship described between surface 30 and surface 52 be maintained. Otherwise stated, there must be a reversal of direction of inclination as liquid passes from wall surface 30 to wall surface 60 in order that the liquid may be separated from the scrap and collected before the scrap passes downwardly and out of the apparatus through lower discharge passage 70 directing the scrap to screw conveyor means 72. Also the angle forces the liquid upwardly toward the outlet as the scrap moves downwardly.

Figure 2:
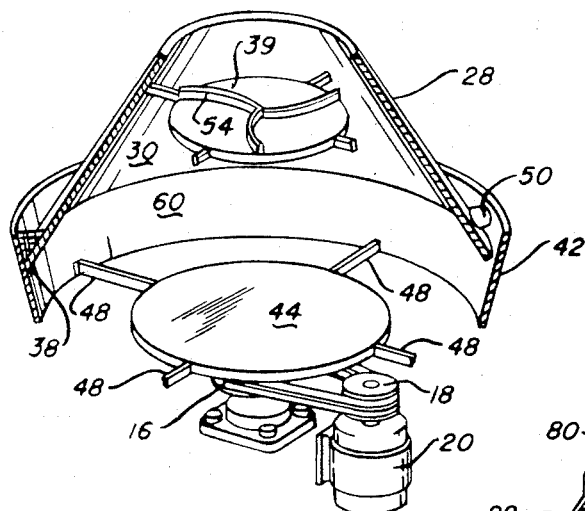
FIGURE 2 is a fragmentary perspective view, with parts in section, of another embodiment of the invention.
Figure 3:
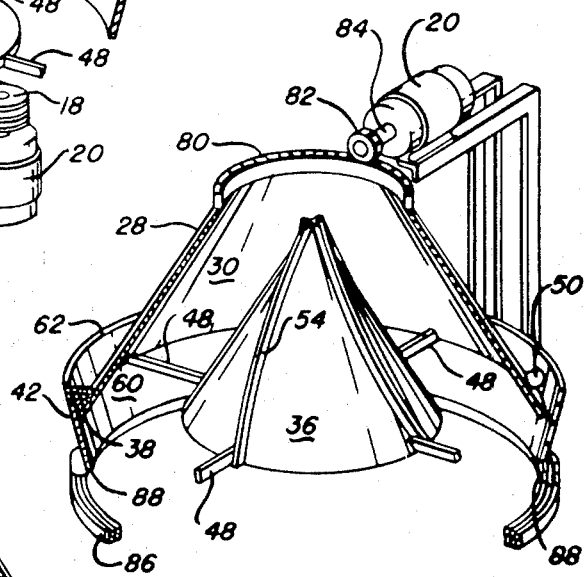
FIGURE 3 is a fragmentary perspective view, with parts in section, of yet another embodiment of the invention.
Figure 4:
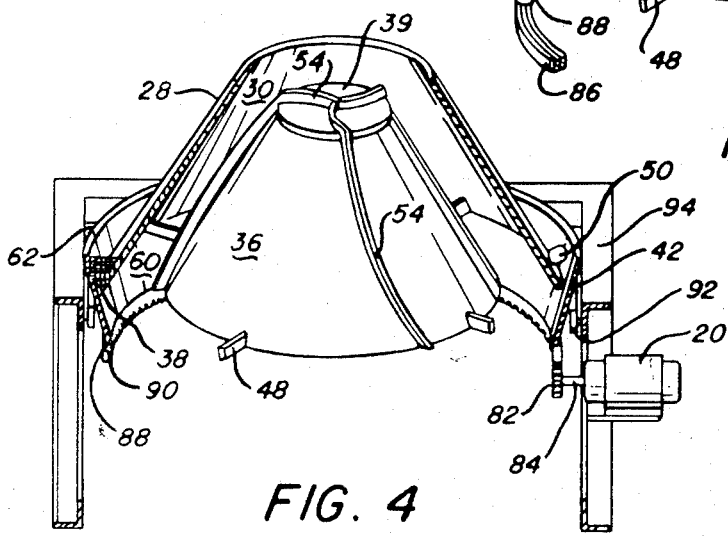
FIGURE 4 is a fragmentary perspective view, with parts in section, of still another embodiment of the invention.

Attention is now directed to FIGURES 2, 3 and 4 in which other embodiments of my invention are shown. In FIGURE 2, for instance the motor drive means 20 is arranged so as to eliminate the central drive shaft 10 employed in the embodiment of FIGURE 1. It will be observed that the spider member 44 is connected to the sheave means 16 at its under surface, and is driven thereby by motor 20. It will also be observed that the scrap interceptor and deflector 36 of FIGURE 1 has been simplified to comprise only a scrap interceptor plate 39 having deflector blades 54 to function in a manner described. The entire unit comprising the upper member 28 and lower member 42 is integrally secured to the spider member 44 by means of connecting arms 48.

In FIGURE 3, the upper member 28 is provided with a ring gear 80 adapted to make engagement with a pinion 82 secured to the drive shaft 84 of the motor 20. A track 86 is provided adjacent the lower peripheral edge 88 of the lower member 42, and track wheels or bearings 88 are secured to the lower member 42 to run in track 86. The scrap deflector member 36 in this instance is modified to comprise a cone having deflector blades 54 extending from the base of the apex of the cone.

In FIGURE 4, the scrap deflector unit 36 is a frusto-conical element having a flat platform member 39 truncating the cone 36, and scrap deflector blades on the surface of the platform 39 as well as along the inclined outer surface of the cone per se. In this embodiment, a ring gear 90 is provided adjacent the lower peripheral edge 88 of the lower member 42 and a pinion gear 82 secured to motor drive shaft 84 is adapted to engage and drive the ring gear to spin the entire assembly. The unit is supported and guided on the roller members 92 journaled in frame 94.

Referring now to the preferred embodiment of my invention illustrated in FIGURES 5, 6 and 7, therein is shown a liquid from scrap separator comprising a frame 100, in which is mounted for rotation on rotatable shaft 102, a rotor member or receptacle 104. The shaft 102 is mounted in bearings 105 as is customary and well understood, and may be driven by any well known electrical motor means 108 either directly or with intermediate belt or gear means, such as illustrated in FIGURES 1 through 4.

The rotor member 104 comprises an outer frusto-conical member 106 being hollow and open at opposite ends 109 and 110. Concentrically positioned within said outer member 106 is a second frusto-conical member 112 spaced sufficiently inwardly from the outer member to provide a passageway 114 therebetween whereby liquid laden scrap may pass freely therethrough. The inner frusto-conical member 112 is hollow but sealed at both ends 116 and 118 so as to be water tight. A fitting 120 is secured in the end 118 so as to enable this inner member 112 to be charged and discharged with a liquid utilized for the purpose of dampening any transient vibration developed during rotation. In like manner, a toroidal tank 122 is secured to the outer wall surface of the outer member 106 and is likewise liquid tight with means 124 to permit charging and discharging a fluid into and from the interior of this tank 122. The purpose of the tank also is to assist in dampening transient vibrations during rotation. The inner wall 126 of this toroidal tank serves an additional function of providing a receiving chamber 130 for scrap conveyorized into the top end 109 of the outer member 106 by conveyor means 132.

Coincident with bell end 134 of the outer member is an inverted frusto-conical member or skirt 136 (see FIGURE 7) having its wall portions converging slightly inwardly and downwardly towards the axis of rotation of the separator. With this construction, the skirt 136 will coact with the outer member 106 to direct fluid to the junction between the bell end 134 and skirt 136. Accordingly, interstices 138 are provided about the periphery of this junction zone and preferably these interstices comprise a plurality of conical holes flaring outwardly from the inner wall surface 140 of outer member 106, and with the interior diameter of the holes being of sufficient dimension to permit fines to pass therethrough without clogging. With the diameter of the holes increasing outwardly, anything that enters the interior side of the hole will, of course, pass freely therethrough into receptacle 146 without obstructing the opening.

The inner surface of chamber 130 is smooth and uninterrupted so that material, even if compacted to a heavy consistency, can move along the surface from the upper opening to the lower opening. The upper portion of chamber 130 is imperforate and forms a generally included angle A. In accordance with the invention, this angle is 15°–85°. In addition, the surface has a slight curvature, especially at the end adjacent interstices 138. In this manner, the material in chamber 130 is forced outwardly and downwardly by both gravity force and the downward resultant force of the centrifugal force. As the material approaches the interstices, the movement is caused primarily by the force exerted by the upper material. This provides a smooth flow of material past the interstices. The lower portion of the chamber, below the interstices, has a slight reverse taper as represented by angle B. This angle can be varied between 0°–15°; however, in practice it is 3°–10°. By providing only a slight reverse taper, the mass of scrap continues to flow through the chamber 130 while liquid is forced upwardly and out the interstices. The main advantage of this type construction is that the mass, which may be quite compacted, can flow completely through the separator without contacting any surface irregularities.

An apron 142 is immovably secured to the frame member 100, is annular in shape and positioned adjacent the skirt member 136 with sufficient clearance for rotation of the rotor member 104. Apron 142 combines with annular wall 147 and base member 149 to define receptacle 146, positioned to receive recovered liquids until carried off through port 151.

It will be observed that the passageway 114 is smooth and unobstructed, with the exception of structural braces 150, and generally downwardly directed so as to permit scrap to freely move from the top to the bottom of the separator. Whereinafter the skirt 136 functions as a large unobstructed discharge portion of the device from which the dry scrap drops freely into hopper 148 and the conveyor 150 for transportation away from the separator. The lower peripheral edge 152 is flared outwardly to prevent scrap from hanging up thereon, and to further function as a baffle to prevent scrap from working into the annular space 154 between apron 142 and skirt 136.

While herein shown and described are several embodiments of my invention, it is contemplated that the invention is susceptible of embodiment in still other forms and is applicable to a variety of situations which would be readily suggested to those skilled in the art upon reading the foregoing specification, all within the intended scope and spirit of the invention.

Having thus described my invention, I claim:

1. In a liquid from scrap separator for recovering substantially all of the liquid from a liquid-scrap mixture and adapted for rotation about an axis of symmetry, the improvement in means for continuously directing substantially all of the liquid of a liquid-scrap mixture radially outwardly from said axis of symmetry from its entry into, to its exit from said separator, comprising a first liquid impervious hollow frusto-conical member open at opposite upper and lower ends and extending radially outwardly and downwardly from said upper end to said lower end, deflector means located concentrically within and spaced from said member adjacent said upper end for deflecting a liquid-scrap mixture received through said upper end radially outwardly, said deflector means being secured to said first member for rotation therewith about said axis of symmetry, a second liquid impervious hollow inverted frusto-conical member open at opposite upper and lower ends and extending radially outwardly and upwardly from its said lower end to its said upper end, said second member secured to said first member for rotation therewith about said axis of symmetry with the upper end of said second member located adjacent the lower end of said member, the upper end of said second member overlies and extends above the lower end of said first member, and said upper end of said second member is spaced radially outwardly of the lower end of said first member to define an annular upwardly and outwardly directed passageway therebetween having a width sufficient to permit liquid but not scrap to pass therethrough, means for rotating said members in unison about said axis of symmetry at sufficient angular velocity that substantially all of the liquid of said liquid-scrap mixture is centrifugally forced outwardly against and directed by said first and second members to said liquid passageway, whereby substantially all of the liquid of said liquid-scrap mixture is continuously directed radially outwardly from said axis of symmetry from its entry into, to its exit from said separator.

2. In a liquid from scrap separator for recovering substantially all of the liquid from a liquid-scrap mixture and adapted for rotation about an axis of symmetry, the improvement in means for continuously directing substantially all of the liquid of a liquid-scrap mixture radially outwardly from said axis of symmetry from its entry into, to its exit from said separator, comprising a hollow symmetrical member open at opposite upper and lower ends, said member having a first wall portion continuously extending downwardly from said upper end and radially outwardly with respect to said axis of symmetry and a second wall portion extending from said first wall portion downwardly toward said lower end and radially inwardly with respect to said axis of symmetry, deflecting means located within said member and spaced from said member adjacent said upper end for deflecting a liquid-scrap mixture received through said upper end radially outwardly toward said first wall portion, said deflecting means being a closed, liquid tight, hollow member having means for charging and discharging liquid therefrom with the charged liquid serving during rotation of said separator to damp transient vibrations, scrap restrictive liquid passage means extending radially outwardly through said member at points adjacent said first and second wall portions, and means for rotating said member about said axis of symmetry at sufficient angular velocity that the liquid of said liquid-scrap mixture is centrifugally forced outwardly against and directed by said member to said liquid passage means, whereby substantially all of the liquid of said liquid-scrap mixture is continuously directed radially outwardly from said axis of symmetry from its entry into, to its exit from said separator.

3. In a centrifugal separator for extracting liquid from a mass of particles having liquid carried therewith, said separator including a receptacle with an upper charging opening and a lower discharging opening, bearing means for rotatably mounting said receptacle on a substantially vertical axis, and motor means for rotating said receptacle in said bearing means and about said axis at a relatively high angular velocity, the improvement comprising: said receptacle having a smooth inner surface extending from said upper to said lower opening and having imperforate upper and lower portions, said upper portion tapering outwardly and downwardly, said lower portion tapering inwardly and downwardly to form a taper reverse to the taper of said upper portion, small liquid outlets in said receptacle at the junction between said upper and lower portions, said outlets being located in a relatively small area of said surface, and the reverse taper of said lower portion being drastically less than the taper of said upper portion, said reverse taper being such that the centrifugal force exerted on said mass by said lower portion is insufficient to impede the downward movement of said mass along said lower portion caused by gravity and the centrifugal force exerted on said mass by said upper portion but sufficient to force liquid from said mass upwardly toward said outlets.

4. In a centrifugal separator for extracting liquid from a mass of particles having liquid carried therewith, said separator including a receptacle with an upper charging opening and a lower discharging opening, bearing means for rotatably mounting said receptacle on a substantially vertical axis, and motor means for rotating said receptacle in said bearing means and about said axis at a relatively high angular velocity, the improvement comprising: said receptacle having a smooth inner surface along which said mass is propelled; said inner surface including: an imperforate uppermost portion tapering outwardly and downwardly whereby said mass adjacent said uppermost portion is forced to slide outwardly and downwardly along said uppermost surface by a combination of gravity and centrifugal force; an intermediate band-like portion with a generally vertical disposition whereby said mass adjacent said intermediate portion is forced to slide downwardly along said intermediate portion by gravity and by force exerted from said mass passing along said uppermost portion; and, an imperforate lowermost portion having a contour which causes the centrifugal force on said mass adjacent said lowermost portion to exert an insufficient upwardly directed force component to stop movement of said mass over said lowermost portion and out said discharge opening; a plurality of orifices circumferentially spaced around only said intermediate portion whereby liquid is centrifugally forced from said mass of particles and against said uppermost surface from where it is moved to and through said orifices; said intermediate portion of said inner surface being a relatively small portion of said surface and being contoured to effect a gradual transition between said uppermost and said lowermost portions whereby said intermediate portion allows smooth, uninterrupted flow of said mass from said uppermost portion to said lowermost portion, said lowermost portion being tapered inwardly and downwardly with this reverse taper of said lowermost portion being only slight and being substantially less than the taper of said uppermost portion whereby any liquid passing downwardly beyond said orifices is centrifugally forced by the reverse taper of said lowermost portion back toward said orifices.

5. The improvement as defined in claim 4 wherein said uppermost portion of said inner surface has a cross section with a slight curvature which curvature intersects said intermediate portion somewhat tangentially.

6. The improvement as defined in claim 4 wherein said orifices are generally circular holes.

7. The improvement as defined in claim 4 wherein there is included a deflector means secured within said receptacle adjacent said upper opening for intercepting said mass entering through said upper opening and for forcing said mass outwardly against said inner surface.

References Cited
UNITED STATES PATENTS

| | | | |
|---|---|---|---|
| 614,764 | 11/1898 | Robbe | 210—369 |
| 850,241 | 4/1907 | Morris | 210—369 |
| 1,031,005 | 7/1912 | Isaacs | 55—406 X |
| 1,520,467 | 12/1924 | Frantz | 210—380 X |
| 1,564,632 | 12/1925 | Schueler | 210—377 X |
| 2,312,829 | 3/1943 | Bird et al. | 210—380 X |
| 2,435,665 | 2/1948 | Woolaver | 233—2 X |
| 2,511,585 | 6/1950 | Howe | 233—2 |
| 2,688,437 | 9/1954 | Monnet | 233—2 |
| 2,836,083 | 5/1958 | Smith | 210—363 X |
| 2,907,465 | 10/1959 | Heckmann et al. | 210—374 |

FOREIGN PATENTS

| | | |
|---|---|---|
| 787,094 | 6/1935 | France. |
| 535,663 | 4/1941 | Great Britain. |
| 87,198 | 4/1956 | Norway. |

REUBEN FRIEDMAN, *Primary Examiner.*

J. L. DE CESARE, *Assistant Examiner.*